United States Patent [19]

Becker

[11] 4,092,034

[45] May 30, 1978

[54] UNITIZED POWER OUTLET HOUSING FOR TRUCK TRACTOR BODY

[76] Inventor: Robert Becker, 2123 Fern Valley Rd., Louisville, Ky. 40213

[21] Appl. No.: 738,304

[22] Filed: Nov. 3, 1976

[51] Int. Cl.² .............................................. B60D 1/08
[52] U.S. Cl. .................................... 280/420; 138/118; 138/178; 339/10
[58] Field of Search ....................... 280/420, 421, 422; 296/15, 28 C; 138/118, 178, 125; 339/10; 174/52 R

[56] References Cited

U.S. PATENT DOCUMENTS

| | | | |
|---|---|---|---|
| 2,733,033 | 1/1956 | Gunderson | 280/421 |
| 3,494,657 | 2/1970 | Tantlinger | 280/421 X |
| 3,854,769 | 12/1974 | Saunders | 296/15 |
| 3,977,440 | 8/1976 | Phillippi | 138/125 |

FOREIGN PATENT DOCUMENTS 68,846   11/1948   Norway ................ 280/421

Primary Examiner—Joseph F. Peters, Jr.
Assistant Examiner—R. Schrecengost
Attorney, Agent, or Firm—Lowe, King, Price & Markva

[57] ABSTRACT

A housing secured to a truck tractor body contains pneumatic and electrical outlets for supplying air pressure and electricity to a trailer for powering brakes and lights. The housing contains an inlet for receiving a pair of air hoses and an electrical cable connected respectively to electrical and pneumatic systems inside the tractor. Inside the housing, the hoses and cables are connected to outlets mounted on the housing shell. Helically coiled hose extensions and jumper cable are connected respectively from the pneumatic and electrical outlets on the housing to suitable inlet connectors on the trailer. When the extensions and jumper are not connected to the trailer, they are attached to retainer brackets on the housing for storage. A lamp is mounted to the housing for illuminating a working area between the tractor body and trailer during hookup of the hoses and cable. The lamp is controlled by a switch mounted on the housing. Other service valves and switches may be mounted in the housing. The sidewalls of the housing are inclined to reduce wind resistance and to avoid interference with the trailer during a hard turn and snagging with external objects.

24 Claims, 6 Drawing Figures

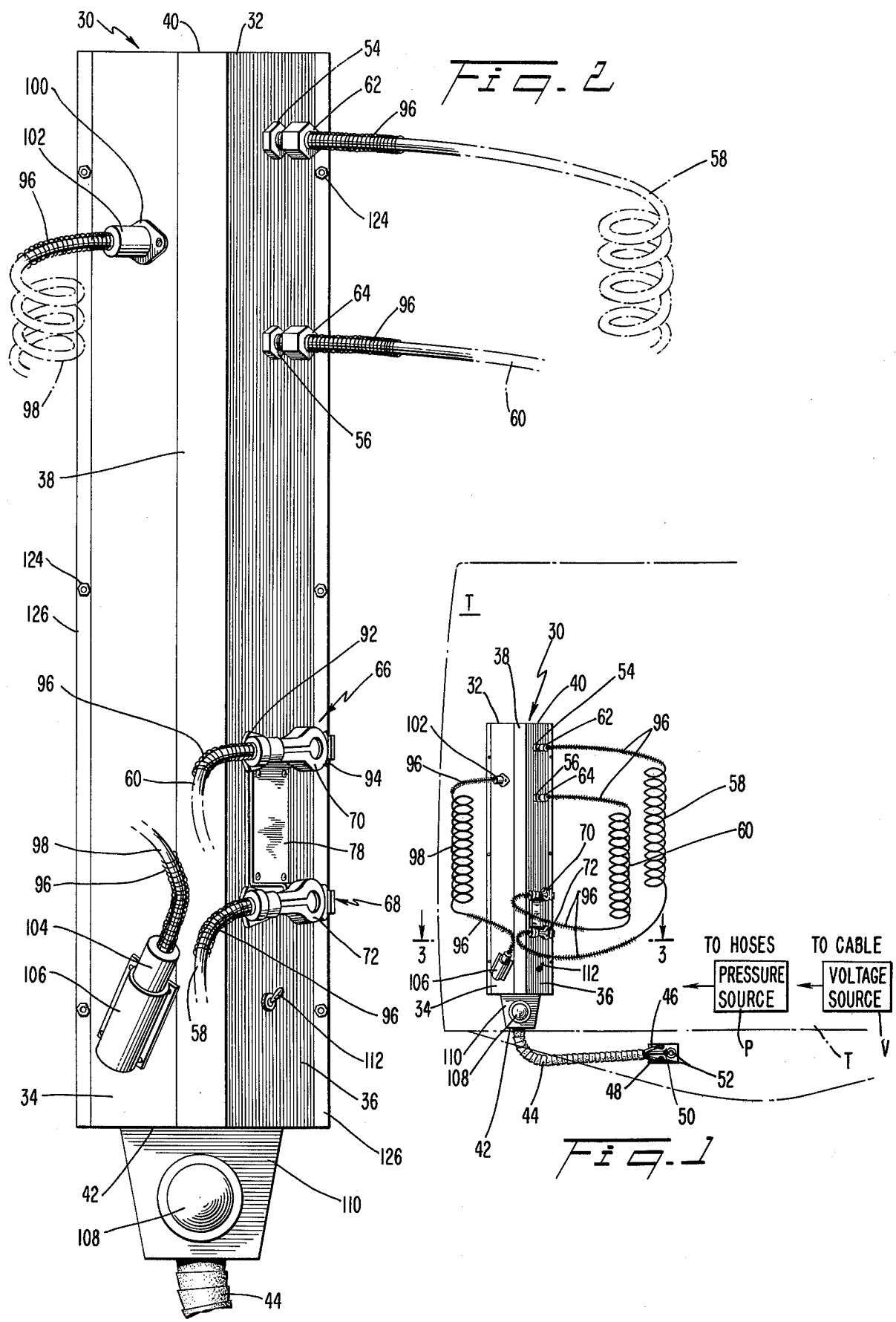

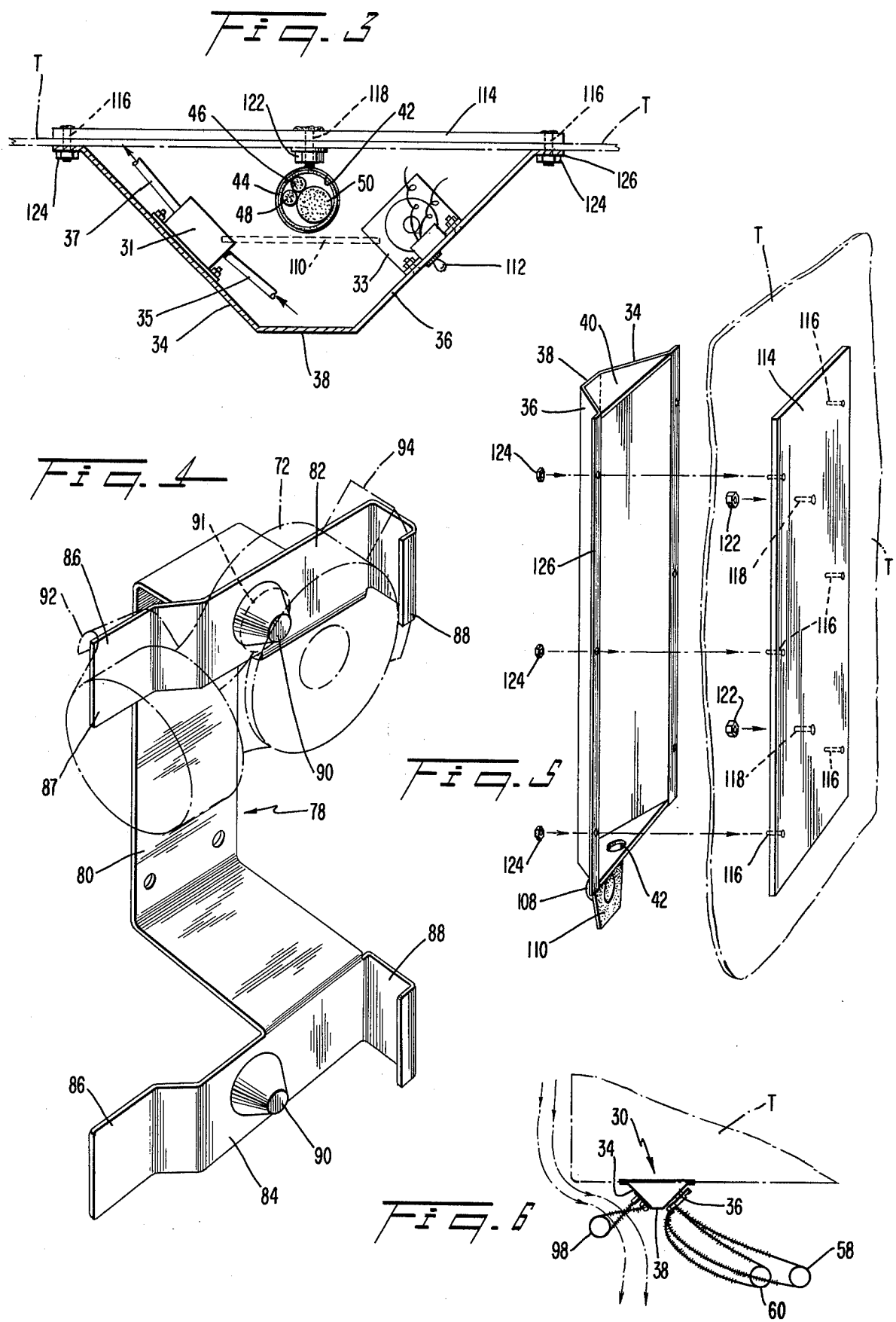

UNITIZED POWER OUTLET HOUSING FOR TRUCK TRACTOR BODY

FIELD OF THE INVENTION

The present invention relates generally to apparatus for supplying compressed air and electricity from a truck tractor to a trailer, and more particularly, toward a unitized power outlet housing secured to an over-the-road truck tractor body containing readily accessible pneumatic and electrical outlets as well as storage brackets for the hoses and cable.

BACKGROUND OF THE INVENTION

Over-the-road tractor-trailers generally utilize braking systems that are energized by a common source of compressed air located in the tractor and supplied to the trailer with a pair of hoses. The electrical requirements of the tractor and trailer are satisfied by a single electrical system including at least one battery that is also located in the tractor. Electrical power is transferred to the trailer for energizing an electrical load, such as trailer lights, with an electrical cable extending between the tractor and trailer.

The hoses are extended from the tractor through an opening in the tractor body under the floorboard. The exposed end of each hose is attached to a pneumatic connector that is coupled to an air inlet on the trailer. Similarly, the free end of the electrical cable contains an electrical connector that is coupled to another connector mounted on the trailer.

The hoses and cable must be sufficiently long to extend between the tractor and trailer. In the prior arrangements of which I am aware, when the tractor is not coupled to a trailer, the hoses and cable hang free supported by a spring hanger. In practice, the free end glad-hand couplers are stored on suitable brackets on the back wall of the tractor. The lengths of the hoses and cable between the brackets and exit point from the body of the tractor create an unsightly appearance, and the hoses and cable tend to become entangled. Entanglement is encouraged by the constant motion of the hoses and cable while the tractor is on the road. When the driver couples the hoses and cable to a trailer, he must first separate them from each other, adding to downtime.

Under certain road and wind conditions, the entangled hoses and cable and the exposed spring hanger tend to cause annoying thumping noises as they bang against the rear of the tractor. Furthermore, the entire lengths of the hoses and cable are exposed to weather and possible damage by and battering from road objects that may be thrown up behind the tractor. The free hanging hoses are subject to a wide swinging movement that can snag external objects, particularly when the tractor is not coupled to a trailer.

As another disadvantage, the repeated bouncing and flexing of the entire length of hoses and cable while on the road, particularly at the spring hanger, contribute to weakening and premature failure.

The hoses and cable are occasionally coupled to the trailer by the operator at night when there is insufficient lighting. It is difficult for the operator to locate the coupling points on the trailer and to separate the various hoses and conduits.

A need exists therefore, for an integrated system that couples compressed air and electricity between a tractor and a trailer in a manner that protects hoses and cable from damage while improving the appearance of the trailer and expediting hookup.

Accordingly, one object of the present invention is to provide a new and improved system for supplying compressed air and electricity between a tractor and a trailer.

Another object of the invention is to provide a new and improved system for supplying compressed air and electricity between a tractor and trailer wherein entanglement of hoses and cable is avoided.

Yet another object of the invention is to provide a new and improved system for supplying compressed air and electricity between a tractor and trailer wherein portions of the hoses and cable are protected by a housing.

Another object is to provide a new and improved system for supplying compressed air and electricity between a tractor and trailer that does not detract from the appearance of the tractor.

Still another object is to provide a new and improved system for supplying compressed air and electricity between a tractor and trailer utilizing a protective housing that has a configuration designed to avoid damage with objects on the road and improve aerodynamics of the tractor body.

Another object of the invention is to provide a new and improved system for supplying compressed air and electricity between a tractor and trailer, including a convenient and secure storage arrangement for hoses and cable.

Still another object of the invention is to provide a new and improved system for supplying compressed air and electricity between a tractor and trailer wherein a working area is illuminated during insufficient ambient light conditions.

BRIEF DESCRIPTION OF THE INVENTION

A unitized power outlet housing, in accordance with the invention, is secured to a tractor body between the tractor and trailer. Outlets for compressed air and electricity are mounted to the housing so as to extend through the housing shell. A pair of hoses extend from a source of compressed air in the tractor through an opening in the tractor body to the compressed air firewall fitting outlets on the housing. Similarly, a cable extends from the electrical system of the tractor through the body opening to the outlet plug on the housing. Both the hoses and cable may be wrapped in a harness for protection and the opening in the tractor body is sealed. Service valves and switches, such as the conventional emergency and air transfer valve and the stop light switch are also contained in the housing.

The preferred form of the housing has an elongated rectangular shape with the cross-section resembling a "V", and encloses the valves, switches, hoses and conduit in the region of the outlets for protection. The sidewalls of the V-shaped housing are inclined outwardly, and the housing is located inboard of the sides of the tractor to reduce wind resistance, to avoid interference with the trailer during a hard turn, and to avoid contacting road objects.

A pair of helically coiled hose extensions are connected to the compressed air outlets at the outside of the housing. These coiled hose extensions are extended to the trailer and are connected to air inlets on the trailer with the conventional glad-hand couplers. A helically coiled jumper cable extends from the electrical outlet on the housing to the trailer. The jumper cable may be wired as a six/seven-way converter, for example, to permit electrical hookup between six wire and seven wire systems or any other desired combination may be selected by simply selecting the proper plugs and sockets.

Both ends of the hose extensions and jumper cable are wrapped within a stiffener formed of spring steel. The purpose of the spring steel is to resist bending of the hoses and cable at the hose-coupler and cable-coupler junctions for greater resistance to weakening due to excessive bending.

When the hoses and cable are not coupled to the trailer, the free ends are stored on special retaining brackets on the housing. The support bracket for the cable is a pocket or sleeve for receiving a cylindrical electrical connector on one end of the cable. The connector on the opposite end may remain plugged into the electrical outlet on the housing. The support bracket for each of the free ends of the pneumatic couplers is a conventional glad-hand bracket mounted along one inclined wall of the housing.

The housing is mounted to the tractor using a mounting plate behind the tractor wall. The plate contains a number of studs that extend to the outside through apertures cut in the wall. A pair of studs are centrally located on the plate and several studs are distributed along the periphery of the plate. The plate is first secured to the wall with a pair of nuts on the centrally located studs. Then, the housing is mounted to the wall on the outstanding peripheral studs and tightened down with nuts. The housing can subsequently be removed to inspect or repair the service valves and outlets by removing only the nuts on the peripheral studs and lifting the housing from the wall.

A broadly focused lamp is mounted on the housing to illuminate a working area between the tractor and trailer. The lamp is energized from the electrical system and battery in the tractor, and is controlled by a switch conveniently located on the housing. The lamp permits the hoses and cable to be more easily coupled to and decoupled from the trailer where there is insufficient ambient lighting.

Still other objects, advantages and features of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWING

FIG. 1 is a front view of the unitized power outlet housing, in accordance with the invention, showing, in block diagram form, the pressure and voltage sources operative, respectively, with the hoses and cable;

FIG. 2 is an enlarged front view of the housing showing portions of the hoses and cable in phantom;

FIG. 3 is a cross sectional view of the housing taken along the line 3—3 in FIG. 1 to expose the valves, hoses and cable within the housing;

FIG. 4 is a perpective view of a glad hand bracket 78 for supporting a glad hand coupler (shown in phantom) of the type used in conjunction with the unitized power outlet housing;

FIG. 5 is an exploded view of the unitized housing showing the tractor body wall (shown in phantom) positioned between the housing and its mounting plate; and FIG. 6 is a top view of the housing mounted on the rear wall of a tractor with symbolized air current flow along the tractor and side wall of the housing.

DETAILED DESCRIPTION OF A PREFERRED EMBODIMENT

Referring to FIGS. 1-3, a unitized power outlet housing 30, in accordance with the invention, is secured to the outside of a conventional over-the-road truck tractor body T and encloses service valves 31 and 33, as well as air transfer hoses 46 and 48 and electrical cable 50. Air pressure and electricity are transferred from housing 30 to a conventional trailer (not shown) with hose extensions 58 and 60 and jumper cable 96, as described below. Housing 30 comprises sheet metal body 32 having an elongated, rectangular configuration, as shown. The body 32 includes left and right inclined sidewalls 34 and 36, respectively, joined together by an intermediate portion 38. The top 40 of body 32 is enclosed whereas the bottom 42 of the body contains an inlet for a harness 44.

Harness 44 contains air transfer hoses 46 and 48 as well as electrical cable 50. The hoses 46 and 48 and electrical cable 50 are connected respectively to a source of compressed air P and an electrical system V shown located inside the tractor T and pass through the body of the tractor through openings 52. Openings 52 are preferably sealed around hoses 46 and 48 and cable 50 by grommets or suitable sealing material to protect the inside of the tractor from receiving moisture.

Air transfer hoses 46 and 48 extend upwardly and longitudinally within housing 30 and are connected to outlets or fire wall fittings 54 and 56, respectively. Coupled to the hoses 46 and 48 and cable 50 inside housing 30 are conventional service valves, such as emergency or tractor protection valve 31 and the combined air transfer valve and stop light switch 33 (FIG. 3). The valve 31 and switch 33 are mounted respectively on walls 34 and 37 of housing 30; hookup of the hoses and cable to valves 31 and 33 is not shown in FIG. 3 for simplicity.

Hose extensions 58 and 60 are connected between the housing 30 and trailer for transferring air to the trailer for operating trailer brakes. The extensions are helically coiled so as to not hang free in a storage position shown in FIG. 1, yet be extendable to the trailer in an operative position (not shown). Hose couplers 62,64 (see FIG. 2) on one end of hose extensions 58 and 60 are coupled to outlets or fire wall fittings 54,56 on housing 30. The opposite ends 66 and 68 of the hose extensions 58 and 60 are connected to conventional glad hand couplers 70 and 72 that are adapted to be mounted to the trailer at suitable air inlets (not shown) thereon by extending the extensions 58 and 60 to the trailer, and then securing the glad hand couplers to the trailer inlets. There is sufficient length of the extensions 58 and 60 to reach the trailer, because as described above, the extensions are helically coiled.

When the air transfer hose extensions 58 and 60 are not coupled to a trailer, i.e., before a trailer hookup, ends 66 and 68 attached to the glad hand couplers 70 and 72, are mounted to a conventional glad hand bracket 78 secured to sidewall 36 of housing.

Referring to FIG. 4, bracket 78 comprises a clip body 80 having coupler support members 82 and 84 formed on the body. Each bracket support member 82,84 includes a pair of ears 86 and 88 for gripping opposite ends of glad hand couplers 70 and 72 (see coupler 72, shown in phantom lines in FIG. 4). Each member 82,84 also includes a raised member 90 that interfits with an inlet orifice 91 in each glad hand coupler 72,74.

Still referring to FIG. 4, one end of support member 82 contains an L-shaped tab 88, and the opposite end contains a straight tab 87. Correspondingly, one end of the glad hand coupler 72 includes a straight ear 94 and the opposite end includes an L-shaped ear 92. Ear 92 of coupler 72 is complementary to tab 87 of support member 82 and ear 88 is complementary to tab 94. With glad hand coupler 72 mounted to support member 82 such that raised member 90 mates with the coupler at orifice 91, ear 88 of the support member is located around tab 94 of the coupler; also tab 92 of coupler 72 is located around ear 86 of support member 82, as shown in FIG. 4.

Glad hand coupler 72 is secured to bracket 78 by mounting the coupler to support member 82 with coupler orifice 91 in mating contact with raised member 90. In order to seat coupler 72 against the raised member 90, it is necessary to first locate the coupler at an angle relative to support member 82 so that the tabs 92 and 94 on the coupler do not contact ears 86 and 88 on the bracket. Then, the coupler 72 is pivoted into place with tab 94 seated under ear 88 and tab 92 located around ear 86. The coupler 72 is secured to bracket 78 by friction established between the ears 86,88 and the tabs 92,94, as well as between raised member 90 and the wall of coupler orifice 91.

In order to minimize bending of the extensions 58 and 60 at the junction of the extensions and hose couplers 62 and 64, as well as at the junctions between the extensions and glad hand couplers 70 and 72, the end portions of both extensions are reinforced by stiffeners 96 formed of spring steel coils. The stiffeners 96 prevent breakage of the extensions caused by fatigue due to continuous bending during over-the-road use. The stiffeners 96 also provide spacing of the extensions from the entire housing assembly by preventing sagging in the extensions, as shown in FIG. 2.

Referring again to FIG. 2, one end of an electrical extension cable 98 is connected to an electrical outlet 100 mounted to housing 30. Electrical outlet 100 is connected to electrical cable 52 within the housing body 32 that enters the housing through inlet 42. Electrical power from outlet 100 is transferred to the trailer with jumper cable 98. A first electrical connector 102 attached to one end of jumper 98 is seated within electrical outlet 100. Another electrical connector 104 at the opposite end of the jumper 98 is adapted to be coupled to a corresponding electrical connector (not shown) in the trailer. The jumper 98 may be wired so as to be operable with either a six wire or seven wire system. Specifically, assuming the tractor T is wired as a six wire system, the tractor can be connected to a six wire trailer directly through jumper 98, or to a seven wire trailer through jumper 98 internally wired for six-wire to seven wire conversion. Any other coversion is readily available by providing suitable connectors on the ends of jumper 98.

When there is no trailer hookup, connector 104 is seated within a sleeve or pocket 106 secured to sidewall 34 of the housing 30. A friction fit is established between connector 104 and pocket 106 so that the connector does not vibrate free from the pocket.

Jumper cable 98 is helically coiled, as shown, in a manner similar to extensions 58 and 60. The end portions of the electrical cable 98 are also reinforced by stiffeners 96.

As mentioned above, housing 30 encloses conventional service valves in addition to the upper end of the air transfer hoses 46 and 48 and electrical cable 50. Referring to FIG. 3, tractor protection valve 31 may be mounted on sidewall 34 of housing 30, and a combination air transfer valve and stop light switch 33 may be mounted on sidewall 36. Valve 31 contains an air inlet 35 and an air outlet 37 which are appropriately connected.

The tractor protection valve 31, which is conventional, locks the tractor and trailer brakes when the pressure from the compressor and reservoir is inadequate to properly stop the truck. The combination valve and switch 33, which is also conventional, activates the stop lights on the tractor T responsive to pneumatic pressure.

The valves 31 and 33 are both mounted to the body 32 of housing 30, rather than to the body of tractor T. Accordingly, should valves 31 and 33 require inspection or servicing, housing 30 is removed from the body of the tractor conveniently exposing both valves attached to the housing.

Referring to FIG. 3, a lamp 108 which is designed to project a widely focused beam of light, is secured to the bottom of housing 30 on a depending flange 110. The lamp 107 is controlled by a toggle switch 112 mounted on sidewall 36 of housing 30. The lamp 107 illuminates the working area between the tractor T and trailer, and assists the driver in the process of connecting hose extensions 58 and 60 as well as jumper cable 98 to the trailer when there is insufficient ambient lighting, such as during the night. Because lamp 108 and switch 112 are mounted to housing 30, the operator can illuminate the working area without having to return to the cabin of the tractor for hand-held lighting.

Switch 112 is a high quality, sealed switch and is located on sidewall 36 of the housing 30 above valve 33 (see FIG. 3). Theft of the switch 112 by removal through inlet 42 is thus nearly impossible because the switch is blocked from the inlet by the presence of valve 33 between the inlet and switch.

Housing 30 is mounted to the body of tractor T using a special mounting plate 114 inside the tractor wall, as shown in FIG. 5. Mounting plate 114 contains a plurality of studs 116 located along the periphery of the plate, and a pair of additional studs 118 in a central region of the plate. The studs 116 and 118 are seated into through holes (not numbered) formed in the plate, and then secured thereto by spot welding. The housing 30 itself is installed on the tractor T by first drilling a series of holes (not numbered) in the tractor body corresponding to the locations of studs 116 and 118. Plate 114 is then mounted against the inside wall of the truck tractor body T with studs 116 and 118 extending to the outside of the tractor wall through the preformed through holes. Mounting plate 114 is initially secured to the body of tractor T with a pair of nuts 122. Housing 30 is then mounted to the remaining studs 116 with the studs passing through apertures 124 formed in side flanges 126 (see also FIG. 2) of the housing 30. The housing 30 is now secured to the body of tractor T using nuts 124. There is no interference between studs 118 and body 32 of housing 30 because the studs extend through the body of tractor T in the central portion of the housing body 32 free of flanges 126.

Referring to FIG. 6, it is apparent that the housing 30 has a trapezoidal horizontal cross-section formed by tapered walls 34 and 36 and the central portion 38. Because wall 36 is tapered, the housing 30 tends to avoid contacting road objects in close proximity to the tractor T, and this provides additional protection to the hose extensions 58 and 60, as well as to jumper cable 98. The tapered wall 34 also provides some streamlining to the tractor T by reducing turbulence in air currents sweeping around the side of the tractor, as shown. Furthermore, the tapered walls 34 and 36 also avoid interference with the body of the trailer during a hard turn.

In summary, there has been provided a power outlet housing 30 for a standard on-the-road truck tractor that encloses air transfer hoses 46 and 48 as well as an electrical cable 50 and service valves 31 and 33. Air pressure and electricity are supplied to suitable inlets on a trailer with hose extensions 58 and 60 and jumper cable 98. The extensions 58 and 60 and jumper 98 are helically coiled to prevent them from hanging free behind the tractor, yet extend to the trailer for hookup, and are reinforced with stiffeners 96. When there is no trailer hookup, the free ends of the hose extensions 58 and 60 and jumper 98 are stored in brackets on the housing. A lamp 108 on the housing illuminates the working area between the tractor and trailer. The housing 30 provides protection to the upper portions of hoses 46,48 and cable 50 that extend along a longitudinal axis of the housing, as well as to the service valves and interconnections.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. In combination:
   a tractor body containing sources of air pressure and electricity;
   a unitized power outlet housing to be secured to said body;
   means for mounting said housing on said body including a mounting plate located behind a wall of said tractor body, said plate including stud means extending through apertures in said body for supporting said housing;
   said housing including a pneumatic outlet;
   a first hose for supplying air pressure from said air pressure source to said pneumatic outlet;
   an electrical outlet; and
   a first cable for supplying electricity from said electricity source to said electrical outlet.

2. The combination of claim 1, including an extension hose for supplying air pressure from said pneumatic outlet on said housing to a trailer, and a jumper cable for supplying electricity from said electrical outlet on said housing to said trailer.

3. The combination of claim 2, wherein said housing includes bracket means attachable to said extension hose and said jumper cable for hose and cable storage.

4. The combination of claim 3, wherein said bracket means includes a sleeve member for receiving an end of said extension cable.

5. The combination of claim 3, wherein said bracket means includes a clip for receiving an end of said extension hose, said clip including a raised member and a pair of ears, said end of said extension hose being attached to an air coupler having an air inlet, said raised member being positioned on said clip for mating with said air inlet with said ears gripping opposite ends of said coupler.

6. The combination of claim 1, wherein said housing includes a tapered wall member for reducing wind resistance of said tractor body.

7. The combination of claim 2, wherein said extension hose and said jumper cable are helically coiled.

8. The combination of claim 6, including stiffener means on end portions of said jumper cable and extension hose for preventing bending thereof.

9. In combination:
   a tractor body containing sources of air pressure and electricity;
   a unitized power outlet housing secured to said body, said housing including a pneumatic outlet;
   said housing supporting a depending lamp for illuminating a working area between said tractor body and a trailer;
   a first hose for supplying air pressure from said air pressure source to said pneumatic outlet;
   an electrical outlet; and
   a first cable for supplying electricity from said electricity source to said electrical outlet.

10. The combination of claim 9, wherein said housing further supports a switch for controlling energization of said lamp.

11. In combination:
    a tractor body containing sources of air pressure and electricity;
    a unitized power outlet housing to be secured to said body;
    said housing including a pneumatic outlet;
    service valve means for operating the stop lights attached to an inner surface of said housing;
    a first hose for supplying air pressure from said air pressure source to said pneumatic outlet;
    an electrical outlet; and
    a first cable for supplying electricity from said electricity source to said electrical outlet.

12. The combination of claim 11, further including a switch mounted to the inner surface of said housing above said service valve means, said switch thereby being non-accessible from a bottom inlet to said housing.

13. The apparatus of claim 11, including an extension hose connectable between said pneumatic outlet and said trailer, and a jumper cable connectable between said electrical outlet and said trailer.

14. The apparatus of claim 13, including means for connecting one end of said extension hose to said pneumatic outlet, first bracket means secured to said housing, and means for connecting the opposite end of said extension hose to said first bracket means for storage.

15. The apparatus of claim 14, wherein said first bracket means includes a body having a raised member and a pair of ears, an end of said extension hose being attached to an air coupler, said raised member being positioned on said body for mating with an air inlet in said coupler, and said ears engaging opposite ends of the coupler.

16. The apparatus of claim 14, including means for connecting one end of said jumper cable to said electrical outlet, and second bracket means secured to said housing, the opposite end of said jumper cable being releasably attachable to said second bracket means for storage.

17. The apparatus of claim 16, wherein said second bracket means includes a sleeve member.

18. The apparatus of claim 16, wherein said extension hose and said jumper cable are helically coiled.

19. The apparatus of claim 16, including stiffener means located at end portions of said extension hose and said jumper cable to minimize bending thereof.

20. The apparatus of claim 11, wherein said housing includes a depending lamp for illuminating a work area between said tractor and trailer.

21. The apparatus of claim 20, including switch means mounted on said housing for controlling said lamp.

22. The apparatus of claim 11, wherein said housing is elongated along a longitudinal axis thereof, said first hose and said first cable being routed along said axis within said housing.

23. The apparatus of claim 11, wherein an upper end and opposite sidewalls of said housing are enclosed.

24. The apparatus of claim 23, wherein said sidewalls are tapered to reduce wind resistance.

* * * * *